Nov. 8, 1927. 1,648,413
E. F. MAAS
RAILWAY CAR WHEEL CONSTRUCTION
Filed Nov. 16, 1926    2 Sheets-Sheet 1

Elov F. Maas.
INVENTOR
BY Marker Clerk
ATTORNEYS.

Patented Nov. 8, 1927.

1,648,413

UNITED STATES PATENT OFFICE.

ELOV F. MAAS, OF CUYAHOGA FALLS, OHIO.

RAILWAY-CAR-WHEEL CONSTRUCTION.

Application filed November 16, 1926. Serial No. 148,628.

This invention relates to an improved construction of railway or railroad car wheels.

The object of the invention is to provide an improved cushioned car wheel construction in which cushioning material is interposed in the wheel construction so as to be between the rail upon which the wheel runs and the bearing or bearings between the wheel and axle, or between the axle and the supported car structure, in order to soften or cushion the blows transmitted to the bearing or bearings as the wheel passes over the rail joints or other uneven or irregular portions of the track.

In the usual railway or railroad car wheel and axle constructions or installations there is a direct metallic contact through the wheel from the rail to the bearing or bearings so that very hard and severe blows are transmitted to the latter as the wheel passes over the rail joints or other inequalities of the track, resulting in early failure of the bearing or bearings due mainly to the hammering action to which they are subjected. This is particularly the case when anti-friction bearings are installed, whether these bearings be installed in the place of the customary journal bearings between the axle and car construction or are arranged between the wheel hub and the axle.

In the present wheel construction, due to the interposition of cushioning material, this hammering action is softened or deadened, or substantially eliminated, whereby the life of the bearing or bearings is materially prolonged, and the installation of anti-friction bearings is made entirely practical, the cushioning material being secured or united to the hub and rim members in such a manner as to take advantage of the tensional as well as the compressional resistance of the cushioning material, in order that the whole mass of cushioning material may be in action at all times for absorbing energy or shocks, to thereby materially improve the cushioning effect of said material.

Another purpose served by the introduction of the cushioning material into the car wheel construction is that it permits the necessary lateral motion which would otherwise have to be provided for in the bearing installation, the cushioning material and the hub and rim members between which it is secured being so relatively arranged that the lateral motion of the rim member is not interfered with or restricted by the hub member, but is only restricted by the cushioning material.

The invention is illustrated in the accompanying drawings in two forms or modifications thereof.

Figure 1:
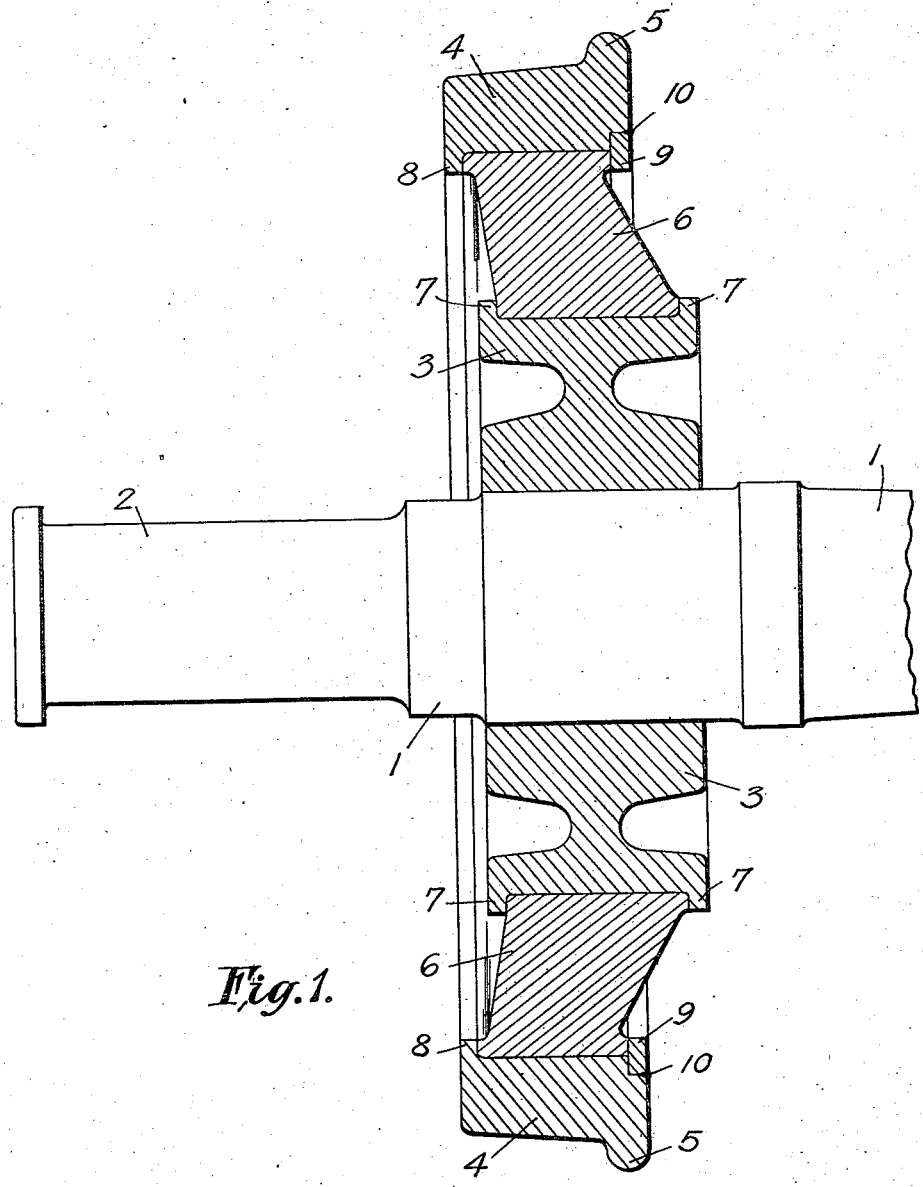
Figure 2:
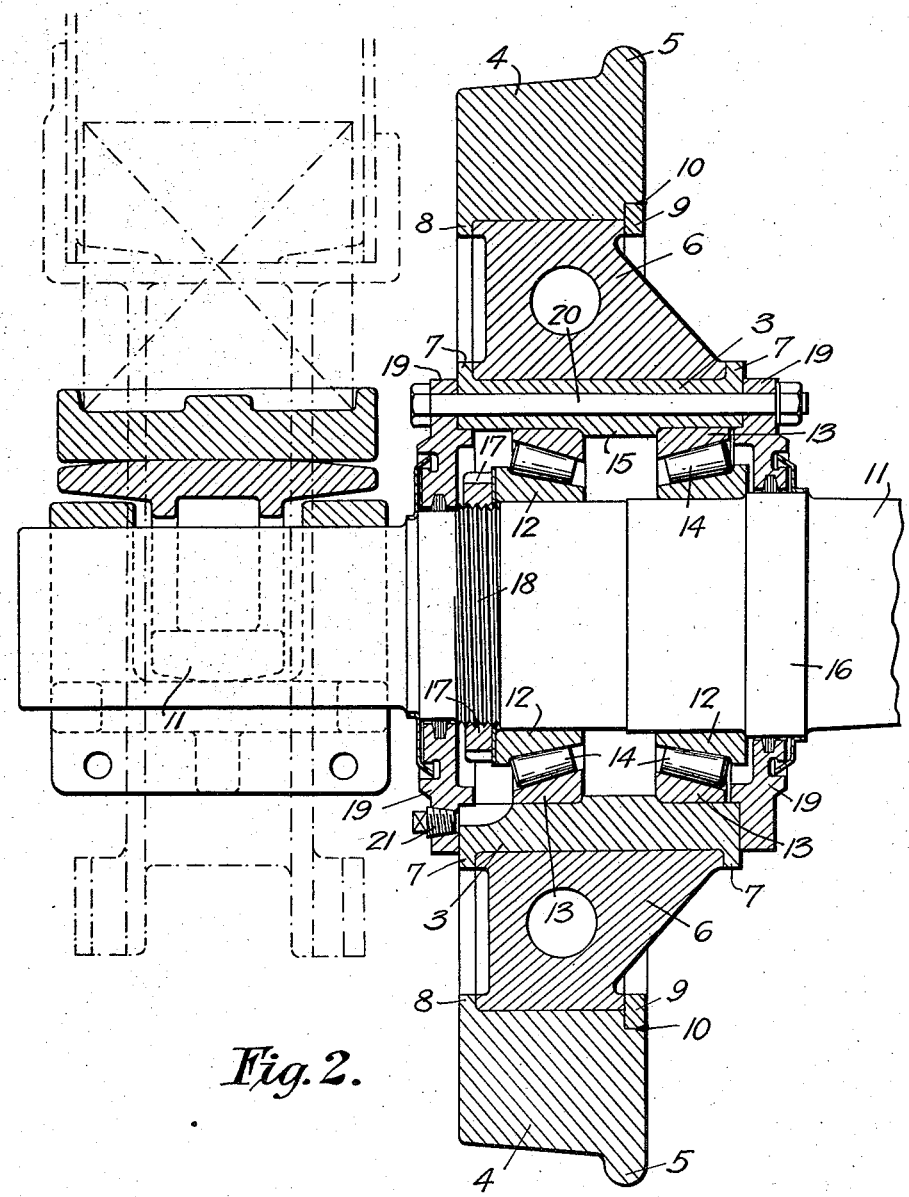

Fig. 1 is a vertical sectional view of the car wheel mounted on a standard axle which may be used in conjunction with either anti-friction bearings or the usual plain journal bearings, and Fig. 2 is a similar vertical sectional view of a car wheel construction in which anti-friction bearings are provided between the car wheel and axle.

Referring firstly to Fig. 1, a usual or standard form of axle 1 is shown, the outer end 2 of which may be formed to cooperate with the usual plain journal bearing of the supported car construction, or with an anti-friction bearing installation of such car construction. The bearing installation is not shown as the particular form thereof does not form any part of the present invention.

The car wheel comprises an annular hub member 3 of steel, or the like, secured in any suitable or usual manner upon the axle 1, and a surrounding annular rim 4 of steel, or the like, provided with the usual flange 5 for engagement with the rail upon which the wheel runs. The hub member could also be formed as an integral part of the axle forging.

Interposed between the hub member 3 and the rim member 4 is an annular cushioning member 6 of a suitable cushioning material such as rubber. The hub and rim members are shown as provided respectively with outwardly and inwardly projecting edge flanges 7 and 8, forming recessed portions in which the inner and outer peripheral portions of the annular cushioning member 6 are seated. Preferably one of the edge flanges of the rim member is formed by a separate ring member 9, to facilitate assemblage of the rim and cushioning members, this ring member 9 being suitably secured to the rim, as by welding, as indicated at 10.

The cushioning material is secured to the rim and hub members, as by permanently uniting the inner and outer peripheral surfaces of the cushioning member to the outer and inner peripheral surfaces of the hub and rim members, in order that advantage may be taken of the tensional resistance of the rubber for cushioning purposes, as well as its compression. Thus when the wheel is in use, the upper half of the annular cushioning member is under tension and the lower half thereof is under compression, and in this way the amount of energy which can be absorbed by the same amount of cushioning material is substantially doubled, the whole mass of cushioning material being in action at all times for absorbing energy.

It is preferred to cure the rubber cushioning material on to both the rim and hub members so that the wheel forms a unitary structure which cannot again be taken apart mechanically. The rubber material may be cured on to the rim and hub members in any suitable manner, for example, in much the same way that a solid truck tire is cured on to its rim. That is, several layers of hard rubber are applied next to the metal with gradually decreasing hardness into the rubber of the cushioning material proper, the whole application of rubber together with the rim and hub members being placed in a mold for curing, with the rubber under pressure and the material so disposed as to form an overflow from the mold. This insures a solid and homogeneous cushion, and there is obtained a union between the steel of the rim and hub members and the rubber which is stronger than the rubber substance itself. The securing of the rubber cushioning member to and between the rim and hub members so as to utilize both the tensional and compressional resistance thereof may, of course, be accomplished in other suitable ways.

In the construction shown in Fig. 2 the wheel proper comprises an arrangement of hub member, rim member, and cushioning member substantially similar to that described with reference to Fig. 1, the parts being correspondingly numbered. The hub member is, however, made somewhat wider to accommodate the anti-friction bearings which are disposed between the hub member and the axle 11. The anti-friction bearings shown are in the form of roller bearings each comprising inner race members 12 engaging the axle and outer race members 13 engaging the hub member and interposed rollers 14. The bearings are spaced apart by an inwardly projecting portion 15 on the hub member, and the bearings and wheel structure are securely held upon the axle with the inner bearing engaging an enlargement 16 on said axle, by means of a nut 17 threaded upon a threaded portion 18 of the axle. Suitable dust and dirt excluding and grease retaining plates 19 are provided secured in place by means of bolts, one of which is shown at 20, passing through the hub member and plates. Grease or lubricant may be supplied to or removed from the bearing structure by the removal of plugs threaded into the outer plate 19, one of which is shown at 21.

The construction for carrying or mounting the car structure on the end of the axle 11, as indicated diagrammatically in Fig. 2, may be the same as disclosed in my prior Patent No. 1,466,240 of August 28, 1923.

It will be seen that the improved car wheel construction essentially comprises a hub member and rim member with an interposed cushioning means between said members, and that this cushioning means is thereby interposed between the rail upon which the car wheel runs and the bearing or bearings, whether this bearing structure comprises the usual plain journal bearing, or an anti-friction bearing installation between the axle and the car structure supported thereby, or a bearing installation between the car wheel and axle. By this interpositioning of the cushioning means or material the blows or hammering action to which the bearing or bearings are usually subjected and caused by the passage of the car wheel over rail joints or other inequalities of the track, are taken up and substantially eliminated, or at least materially softened or deadened by the cushioning means or material. The elimination of these severe blows or this hammering action materially prolongs the life of the bearing, whatever form of bearing is employed, and makes the installation of anti-friction bearings either between the wheel and axle, or between the axle and car structure, thoroughly practical and effective.

It will also be noted that the provision of the cushioning means or material permits a certain lateral movement of the rim member of the wheel relatively to the remainder of the wheel construction. This lateral motion has previously been provided for in the bearing installation, as described for example in my prior patent above mentioned. As the lateral motion in the present construction is provided for by the cushioning material, the bearings may be rigidly mounted as described with reference to Fig. 2, thereby rendering the same more effective.

What I claim and desire to secure by Letters Patent is:—

1. Railway car wheel, comprising in combination, a hub member, a rim member, and cushioning material interposed between and united to both said rim member and said hub member.

2. Railway car wheel, comprising in combination, a hub member, a rim member, and an annular member of cushioning material interposed between said rim member and said hub member, and united over its outer and inner peripheral surfaces to the inner and outer peripheral surfaces of said members.

3. Railway car wheel, comprising in combination, a hub member, a rim member, and cushioning material interposed between said rim member and said hub member, and secured to both of said members to both tensionally and compressively resist relative radial movement of said members.

4. Railway car wheel, comprising in combination, a hub member, a rim member, and an annular rubber cushioning member interposed between said rim member and said hub member, and secured in permanent union at its inner and outer peripheral surfaces to said members.

5. Railway car wheel, comprising in combination, a hub member, a rim member, and rubber cushioning means interposed between said rim member and said hub member and cured on to said members to form a permanent unitary structure.

6. Railway car wheel, comprising in combination, a hub member, a rim member, and an annular rubber cushioning member interposed between said rim member and said hub member and cured on to both of said members to form a permanent unitary structure.

7. Railway car wheel construction, comprising in combination, an axle, a hub member on said axle, a rim member surrounding said hub member, and an annular member of cushioning material interposed between and permanently united to both said rim member and said hub member.

8. Railway car wheel construction, comprising in combination, an axle, anti-friction bearing means mounted on said axle, a hub member mounted on said bearing means, a rim member surrounding said hub member, and cushioning means interposed between and permanently united to both said rim member and said hub member.

9. Railway car wheel construction, comprising in combination, an axle, an annular hub member on said axle, an annular rim member surrounding said hub member, and an annular member of cushioning material interposed between and united to both said rim member and said hub member, said hub and rim members not extending inwardly and outwardly respectively substantially beyond the circumferential lines of union between the same and said cushioning material.

10. Railway car wheel construction, comprising in combination, an axle, anti-friction bearing means mounted on said axle and held against lateral movement thereon, a hub member mounted on said bearing means and held against lateral movement relatively thereto, a rim member surrounding said hub member, and cushioning means interposed between and secured to the outer and inner peripheral surfaces of said hub member and said rim member but otherwise free from engagement with said members to permit both radial and lateral movement of said rim member relatively to said hub member.

11. Railway car wheel, comprising in combination, an annular hub member, an annular rim member, and an annular member of cushioning material interposed between the inner and outer peripheral surfaces of said rim member and said hub member and secured to both of said members with its side faces free from engagement with said members, to permit lateral movement of said rim member relatively to said hub member restricted only by said cushioning material.

In testimony whereof I affix my signature.

ELOV F. MAAS.